(12) United States Patent
Johnson et al.

(10) Patent No.: US 7,433,603 B2
(45) Date of Patent: Oct. 7, 2008

(54) USING ACTIVE AND PASSIVE OPTICAL COMPONENTS FOR AN OPTICAL NETWORK

(75) Inventors: Alan Johnson, San Jose, CA (US); Michael Munroe, Petaluma, CA (US); Eric Maniloff, Kanata (CA); Shasi Raval, Belmont, CA (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 10/319,052

(22) Filed: Dec. 13, 2002

(65) Prior Publication Data

US 2004/0126113 A1 Jul. 1, 2004

(51) Int. Cl.
*H04B 7/216* (2006.01)
*H04J 14/02* (2006.01)

(52) U.S. Cl. ............... 398/168; 398/78; 398/153; 398/165; 398/166; 398/167.5; 398/77

(58) Field of Classification Search ............... 398/153, 398/165, 166, 167.5, 77–78, 168
See application file for complete search history.

(56) References Cited

U.S. PATENT DOCUMENTS 5,473,696 A * 12/1995 van Breemen et al. ...... 713/162
5,812,318 A * 9/1998 Babbitt et al. ............... 359/559
6,313,771 B1 * 11/2001 Munroe et al. .............. 341/137
6,314,220 B1   11/2001 Mossberg et al. ............. 385/37
6,865,344 B1 *  3/2005 Johnson et al. ............... 398/77
7,065,298 B1 *  6/2006 Munroe et al. ................ 398/77
2002/0163696 A1 * 11/2002 Huang et al. ................ 359/154
2003/0063843 A1 *  4/2003 Horne .......................... 385/24

FOREIGN PATENT DOCUMENTS

WO    WO 00/30282    *   5/2000

OTHER PUBLICATIONS

"Passive Optical Fast Frequency-Hop CDMA Communications System", Habib Fathallah, IEEE Journal of Lightwave Technology, vol. 17, No. 3 Mar. 1999.*
"Reductions of Multiple-Access Interference in Fiber-Grating-Based Optical CDMA Network", Jen-Fa Huang, IEEE Transactions on communications, vol. 50, No. 10, Oct. 2002.*

* cited by examiner

*Primary Examiner*—Jason Chan
*Assistant Examiner*—Danny W Leung
(74) *Attorney, Agent, or Firm*—Trop, Pruner & Hu, P.C.

(57) ABSTRACT

In one embodiment, the present invention includes a network hub having an active optical encoder where the network hub is to generate a plurality of addressed optical data signals, each having a common carrier wavelength and a different address corresponding to a network node coupled to the network hub. Other embodiments are described and claimed.

4 Claims, 3 Drawing Sheets

USING ACTIVE AND PASSIVE OPTICAL COMPONENTS FOR AN OPTICAL NETWORK

BACKGROUND

The present invention relates to optical communication networks, and more specifically to the encoding and decoding of optical communications.

Optical communication networks include a network hub that transmits optical data to and receives optical data from a plurality of network nodes. In a forward channel (network hub to network node direction), optical data signals are optically encoded with an address to produce addressed optical data signals ("addressed data signals") that are transmitted to network nodes that include decoders that decode or attempt to decode the addressed data signals. An addressed optical data signal intended for a selected network node is recognized at the selected network node by decoding the data with a decoder that is "matched" to the addressing encoder at the network hub. The matched decoder decodes the addressed data signal to recover data from the addressed data signal. At other network nodes, the decoder is typically "unmatched" to the encoder and the addressed optical data signal is improperly decoded, generally producing a low-level, noise-like signal from which data recovery is difficult.

Optical networks typically have fixed encoders and decoders. Other optical networks rely on multiple wavelengths (i.e., wavelength division multiplexing) that use valuable optical bandwidth and are difficult to re-provision when additional network nodes are added. Other networks rely on precise timing synchronization between coders and decoders which requires accurate, high-speed electronics. Thus a need exists for an optical network directed to these problems.

DETAILED DESCRIPTION

Figure 1:
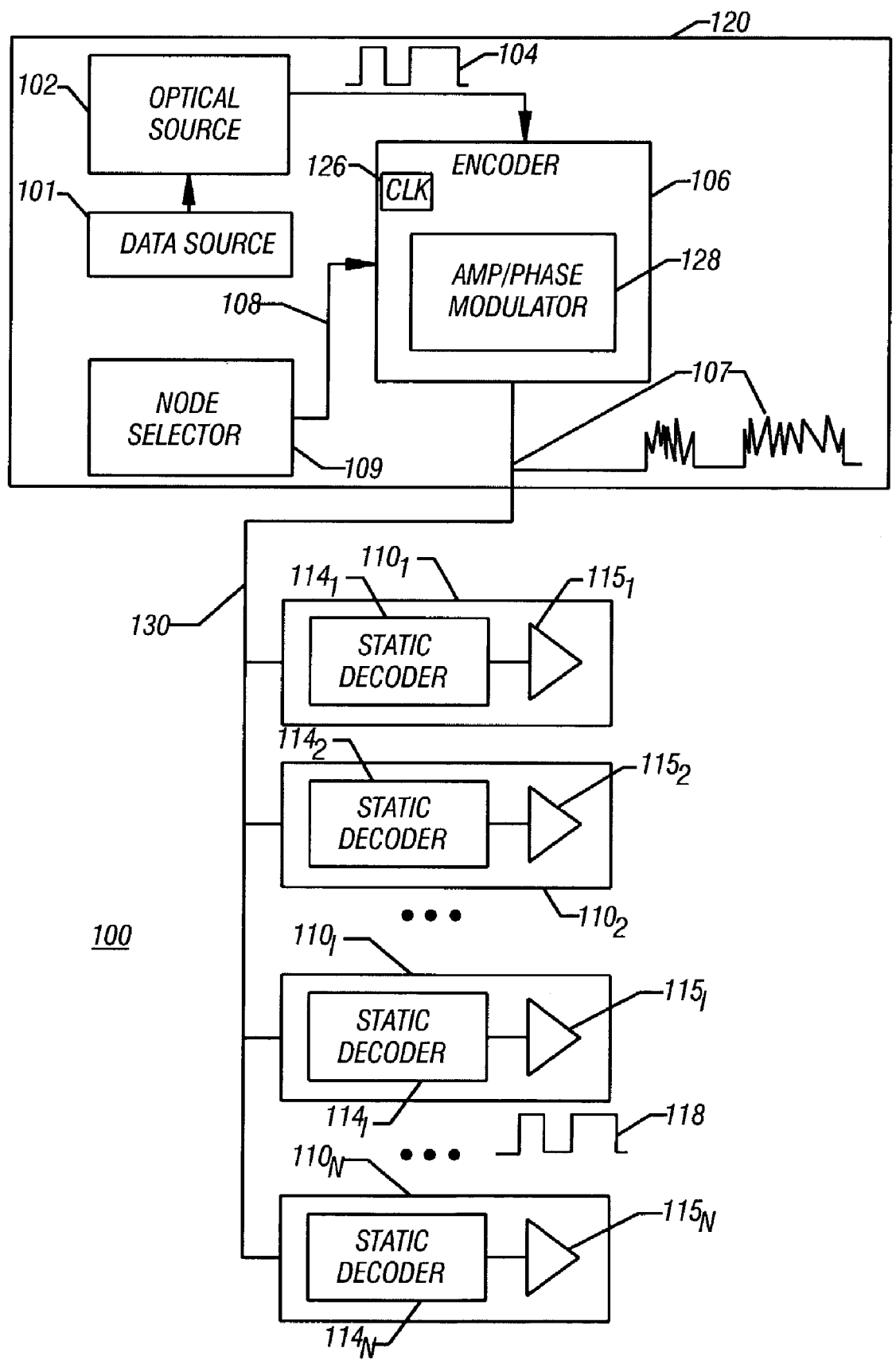
FIG. 1 is a block diagram of an optical network in accordance with one embodiment of the present invention.

FIG. 1 is a block diagram illustrating an optical network in accordance with one embodiment of the present invention. As used herein, "encoding" and "decoding" may be referred to generically as "coding," and devices that encode or decode may be referred to as "coders". In the embodiment of FIG. 1, the network 100 may provide for hybrid static/dynamic encoding and decoding. In this embodiment, active (dynamic) encoding devices and passive (static) decoding devices may be used. As used herein, "active" means reconfigurable and flexible, as the encoding device may serve to impress address information onto an optical data stream, such that different address information reconfigures the encoder to code for different decoding devices. As used herein, "passive" means stationary or fixed, as the decoding device may be configured to decode signals corresponding to a single address. In one embodiment, network 100 may be an optical code-division multiple access (O-CDMA) communication network based on active encoders and passive decoders.

As shown in FIG. 1, network 100 includes a network hub 120 and network nodes $110_1$, $110_2$, ..., $110_N$ (generically, "network node 110"). In the embodiment of FIG. 1, the network hub 120 may be connected to the network nodes 110 by an optical fiber 130. However in other embodiments, other transmission media may be used to connect network hub 120 to network nodes 110. Further, while shown in FIG. 1 as a single hub, it is to be understood that in other embodiments multiple hubs may be present.

As shown in the embodiment of FIG. 1, network hub 120 includes an encoder 106, an optical source 102, a data source 101 and a node selector 109. Data source 101, which may be a computer system or other data source connected to the network hub 120, may be used to modulate optical source 102. In various embodiments, data source 101 may be connected to network hub 120 via an external communication network, such as an electro-optical network. Optical source 102 may be a light emitting diode (LED), laser or the like. Optical source 102 outputs an optical data signal 104 that is provided to encoder 106. In the embodiment of FIG. 1, optical data signal 104 is illustrated as a non-return-to-zero (NRZ) amplitude-modulated signal, but it is to be understood that other formats and keying methods, such as return-to-zero (RZ) frequency shift keying, phase shift keying, or other formatted or keyed signals may be used.

Encoder 106 receives optical data signal 104 and a node address 108 from a node selector 109. In one embodiment, node selector 109 may be a microcontroller or other device able to generate addresses corresponding to the network nodes 110. Encoder 106 modulates optical data signal 104 based on node address 108, producing an addressed optical data signal ("addressed data") 107.

In certain embodiments, encoder 106 may include a phase modulator, an amplitude modulator, or an amplitude and phase modulator 128 that receives the node address 108 and modulates the optical data signal 104 accordingly. Addressed data 107 is then transmitted along optical fiber 130 to network nodes 110.

As shown in FIG. 1, the network nodes 110 may include a respective static decoder $114_1$, $114_2$, ..., $114_N$ (generically, "static decoder 114") and a respective detector $115_1$, $115_2$, ..., $115_N$ (generically, "detector 115"). In one embodiment, the static decoders 114 may be complex spectral filtering devices based on surface or volume gratings, such as complex waveguide Bragg gratings or arrayed waveguide gratings. That is, in such embodiments, the static decoders 114 may be filter devices without any associated electronics. The static decoders 114 may be designed to match a particular waveform that is selected as a node address code ("address"). Thus decoder 114 having a code matched to a given transmitter code (i.e., address) will recover the data from addressed data 107 and provide decoded signals to its associated detector 115. In certain embodiments, multiple decoders 114 may be matched to a given transmitter code. Detectors 115 may be positive intrinsic negative (PINs) or avalanche photodiodes (APDs), in certain embodiments. It is to be understood that while not shown in FIG. 1, certain embodiments of network 100 may include active decoders at certain network nodes 110.

As shown in FIG. 1, node $110_I$ is illustrated as having a static decoder $114_I$ that is matched to address 108. Thus static decoder $114_I$ removes address 108 from addressed data 107 and produces a received optical data signal 118 corresponding to the transmitted optical data signal 104. Detector $115_I$ converts optical data signal 118 into an electronic signal (not illustrated in FIG. 1). Such electronic signal may be provided to a device connected to node $110_I$. In various embodiments, the device may be any manner of data processing system, such as a personal computer, server computer, storage system, or the like.

To send data to a different network node, address 108 supplied to encoder 106 may be changed to the address of the desired network node. In such manner, a different address is modulated onto optical data signal 104 to permit reception by a different network node.

In various embodiments, encoder 106 provides for transmission of data to different static network nodes 110 using a single carrier wavelength and without the need for complex synchronization or the like. Thus in such embodiments a flexible optical network permits data to be sent from one or more transmitters (e.g., hubs) to one or more receivers (e.g., nodes) without reliance on wavelength or synchronization to differentiate the various receivers, thus permitting dynamic reconfigurability and programmability of the network. By reconfiguring the transmitter code, the network node(s) to which data are sent may be changed. In such manner, this network is able to dynamically change addresses for a data stream without shifting to new wavelengths or relying on synchronization between transmitter and receiver. In certain embodiments, various multiplexing schemes may be used, such as code-division multiple access (CDMA) or time-division multiple access (TDMA), for example.

In some embodiments, encoder 106 may generate a periodic address modulation so that optical data signal 104 receives a periodic modulation that is asynchronous with the optical data signal 104. Typically, data source 101 produces a synchronization signal (i.e., a clock signal (not shown in FIG. 1)) that is supplied to a clock input 126 of the encoder 106 and the address 108 is synchronously modulated onto the optical data signal 104. With such address modulation, each data bit of data signal 104 can be directed to any selected network node 110 in response to node addresses 108 supplied by node selector 109.

Such addressing is referred to as "bit by bit" addressing because each bit is independently addressable. That is, each bit of data includes an entire address. In certain embodiments, bit by bit addressing may be particularly useful in demultiplexing optical data signal 104 if the optical data signal is time-division multiplexed.

Figure 2:
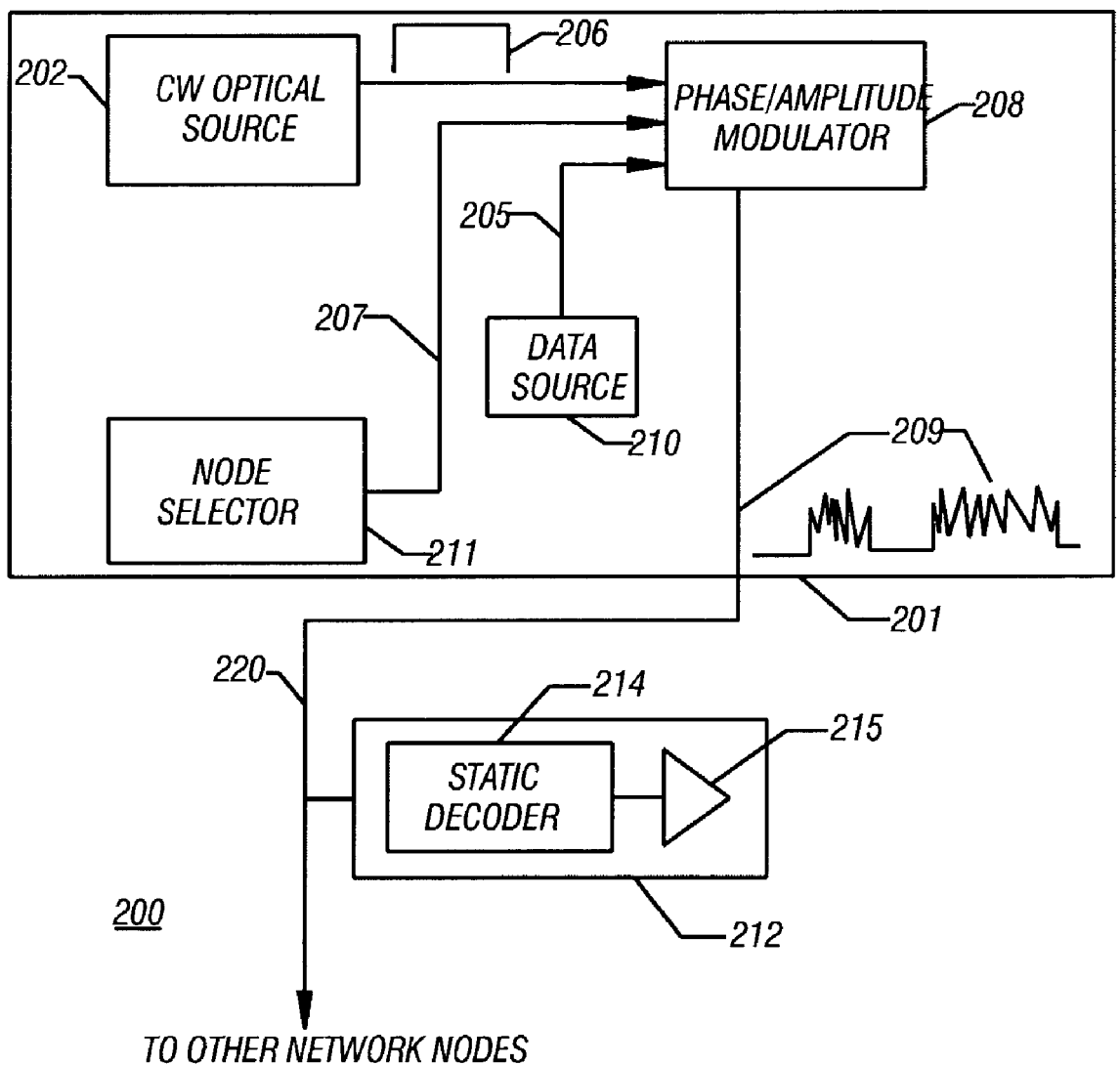
FIG. 2 is a block diagram of an optical network in accordance with a second embodiment of the present invention.

Referring now to FIG. 2, shown is a block diagram of a network according to a second embodiment of the present invention. As shown in FIG. 2, network 200 includes a network hub 201, a network node 212, and a transmission medium 220. While FIG. 2 only shows a single network node 212, it is to be understood that a number of such network nodes may be connected to network hub 201.

In the embodiment shown in FIG. 2, network hub 201 includes a continuous wave (CW) optical source 202, a node selector 211, a data source 210, and a phase and amplitude modulator 208. In one embodiment, optical source 202 may be a continuous wave laser that produces a CW optical output 206. Phase and amplitude modulator 208 receives the CW optical output 206, a node address 207 provided by node selector 211, and data 205 provided by data source 210. From these inputs, modulator 208 generates an addressed data signal 209. In one embodiment, data source 210 and node selector 211 may be identical to those discussed above with regard to FIG. 1.

In network 200, modulator 208 serves both to apply data and to encode a node address. A modulator in accordance with one embodiment may be a Mach-Zehnder modulator that includes both phase and amplitude modulation inputs. In one embodiment using such a modulator, node address 207 can be phase-modulated while data 205 is amplitude-modulated onto the CW optical output 206. Alternately, node address 207 can be amplitude modulated and data 205 can be phase modulated. In yet other embodiments, address 207 and data 205 can be modulated onto the CW optical output 206 as combinations of phase and amplitude modulation. In one embodiment, network node 212, which has a static decoder 214 and a detector 215, may operate in like fashion to network nodes 110 of FIG. 1.

Figure 3:
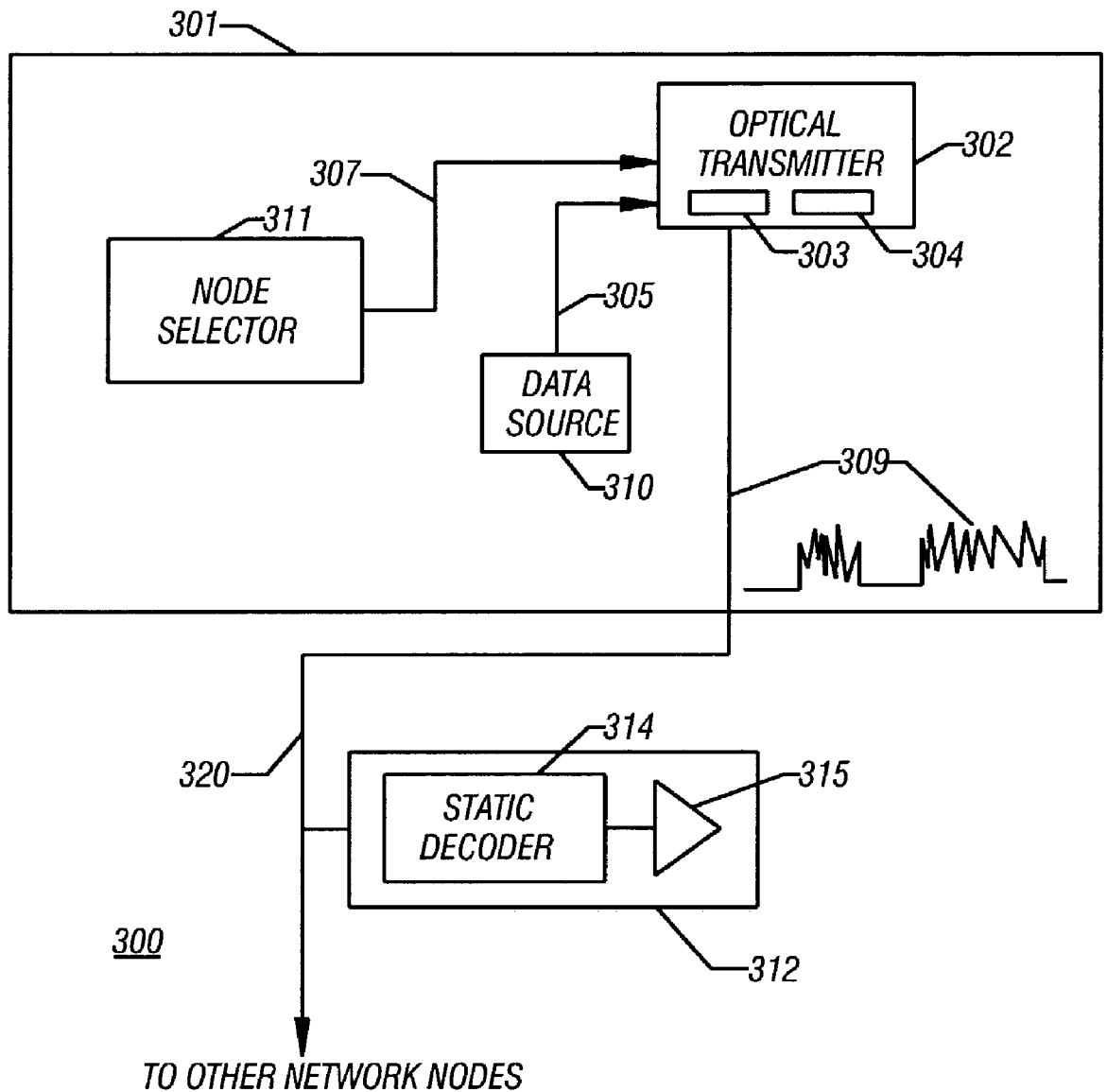
FIG. 3 is a block diagram of an optical network in accordance with a third embodiment of the present invention.

Referring now to FIG. 3, shown is an optical network in accordance with yet another embodiment of the present invention. As shown in FIG. 3, network 300 includes a network hub 301, a network node 312, and a transmission medium 320. While FIG. 3 only shows a single network node 312, it is to be understood that a number of such network nodes may be connected to network hub 301.

In the embodiment of FIG. 3, network 300 includes an optical transmitter 302 that includes a modulator 303 and an optical source 304. In one embodiment, optical source 304 may be a laser diode and modulator 303 may be an integrated waveguide modulator, such as a Mach-Zehnder modulator.

Optical transmitter 302 receives a node address 307 provided by node selector 311 and data 305 provided by data source 310. From these inputs, optical transmitter 302 generates an addressed data signal 309. In one embodiment, data source 310 and node selector 311 may be identical to those discussed above with a regard FIG. 1. As discussed above, various modulation schemes, including amplitude modulation, phase modulation or a combination of phase and amplitude modulation may be provided via optical transmitter 302. Network node 312, which has a static decoder 314 and a detector 315, may operate in like fashion to network nodes 110 of FIG. 1.

In various embodiments, the address duration may be generally less than or equal to the inverse of the data rate so that each bit of an optical data signal is fully encoded by the modulator with an address. In typical embodiments, the address duration may be approximately equal to the inverse of the data rate.

The address modulation bandwidth is the bandwidth associated with the modulation of the address onto an optical data signal. The product of the address modulation bandwidth and the address duration may be referred to as the network spreading gain. Networks having large spreading gains have relatively large numbers of addresses available for network nodes. Modulators having modulation bandwidths of 40 gigahertz (GHz) or more are available, so that for a 1 gigabit per second (Gbit/s) data rate, a spreading gain of 40 (16 dB) is achievable. For lower data rates, the spreading gain may be even greater.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:

a network hub having an active optical encoder, the network hub to generate a plurality of addressed optical data signals that are time-division multiplexed, each of the addressed optical data signals having an identical carrier wavelength and an address corresponding to at least one of a plurality of network nodes coupled to the network hub, wherein at least one of the plurality of addressed optical data signals comprises a plurality of data bits each encoded with the address corresponding to the at least one network node in a bit-by-bit addressing scheme in which each data bit is independently addressable and includes an entire address of a corresponding network node;

an optical source coupled to the active optical encoder to provide an optical data output to the active optical encoder;

a node selector comprising a microcontroller coupled to the active optical encoder to provide the address to the active optical encoder, wherein the node selector is to provide node addresses corresponding to the plurality of network nodes; and a data source coupled to the optical source, wherein the active optical encoder of the network hub is to receive a synchronization signal from the data source at a clock input of the active optical encoder and is to synchronously modulate the address onto the optical data output, wherein the active optical encoder is to dynamically change addresses for a data stream including the plurality of data bits without shifting of wavelength or reliance on network hub and network node synchronization.

2. The apparatus of claim 1, wherein each of the plurality of network nodes includes a passive decoder.

3. The apparatus of claim 1, wherein the active optical encoder comprises an optical transmitter having a modulator and an optical source.

4. The apparatus of claim 1, wherein the active optical encoder comprises at least one of an amplitude modulator and a phase modulator.

* * * * *